United States Patent [19]

Draper

[11] 4,010,329
[45] Mar. 1, 1977

[54] CRESCENDO CONTROL OF SIGNALLING DEVICES

[76] Inventor: Frederick Gaylord Draper, 1263 Redwood Court, Herndon, Va. 22070

[22] Filed: Oct. 29, 1975

[21] Appl. No.: 626,838

[52] U.S. Cl. .......................................... 179/84 T
[51] Int. Cl.² .......................................... H04M 1/00
[58] Field of Search ............. 179/84 T, 84 R, 1 M; 324/157; 323/94 R; 340/384 R, 384 E

[56] References Cited
UNITED STATES PATENTS

| | | | |
|---|---|---|---|
| 3,343,100 | 9/1967 | Medina | 179/84 T |
| 3,387,097 | 6/1968 | Beadle et al. | 179/84 T |
| 3,450,846 | 6/1969 | Why | 179/84 T |
| 3,466,403 | 9/1969 | Combridge et al. | 179/84 T |
| 3,636,449 | 1/1972 | Partridge | 324/157 |

Primary Examiner—Kathleen H. Claffy
Assistant Examiner—Joseph A. Popek

[57] ABSTRACT

A signalling circuit including an electrical to acoustic transducer which is sequentially energized by a pulsatile ringing source includes a potentiometer in series between the source and transducer. The potentiometer is continually decreased in resistance as source pulsations continue so that each successive acoustic output is of increased intensity. The wiper of the potentiometer is a needle of a meter movement and the fixed resistance of the potentiometer is arcuate and positioned in place of a meter scale.

A passive quasi-integrator circuit is coupled between the source and the input to the meter movement for producing a generally increasing signal for advancing the wiper along the resistance.

2 Claims, 3 Drawing Figures

CRESCENDO CONTROL OF SIGNALLING DEVICES

FIELD OF THE INVENTION

The present invention relates generally to acoustic signalling devices which are sounded in a series of actuations. In its particular aspects the present invention relates to the provision of a motor driven potentiometer in series with the signalling device, the motor of which is controlled for advancing a wiper of the potentiometer along a resistor means as the pulsations continue.

BACKGROUND OF THE INVENTION

In signalling such as in telephone applications, it is desirable to provide each successive ring of the telephone of a greater intensity than the ring which immediately preceeded it. Thus, an initial signal may be of soft intensity while after several rings the intensity may become loud enough to be heard at a considerable distance. U.S. Pat. Nos. 3,387,097 and 3,450,846 relate to the mechanization of this feature utilizing a thermistor, while U.S. Pat. No. 3,343,100 relates to the provision of a sawtooth modulator for producing repeated output crescendos.

The techniques in these aforementioned patents for producing an increasing acoustic signal have been expensive of construction and have generally been relegated to circuits which include tone oscillators within the telephone for driving the telephone acoustic signalling device.

OBJECTS OF THE INVENTION

It is an object of the present invention to provide an acoustic signalling device responsive to a ringing source in the form of a series of pulsations which signalling device includes an electromechanically driven potentiometer whose resistance is decreased as the pulsations continue.

It is a further object of the present invention to provide a simple and effective signalling circuit responsive to a ringing source which has an acoustic output of increasing intensity as the ringing source continues to be present.

SUMMARY OF THE INVENTION

Briefly, the aforementioned and other objects of the present invention are satisfied by providing a crescendoing signalling device responsive to a source of sequential pulsations. The device includes an electrical to acoustic transducer which is in series with a potentiometer having a motor driven wiper.

The motor is formed as a meter movement and the wiper is essentially a needle rotated by the movement in proportion to the signal on the input terminals of the movement.

For producing a steadily increasing signal for driving the meter movement so that the needle may continually advance for decreasing the resistance of the potentiometer as the source pulsations continue, a passive quasi-integrator is provided responsive to the source. The quasi-integrator is a resistance capacitance network. A zener diode is also provided shunting the meter movement for setting the maximum voltage that may be applied thereto.

Other objects, features and advantages of the present invention will become apparent upon perusal of the following detailed description of the preferred embodiment thereof when taken in conjunction with the appended drawing wherein:

FIG. 1 is a schematic of the signalling device of the present invention. The signals I, and V are labelled thereon; and FIGS. 2A and 2B are aligned time plots respectively having ordinates I and V.

DETAILED DESCRIPTION

Figure 1:
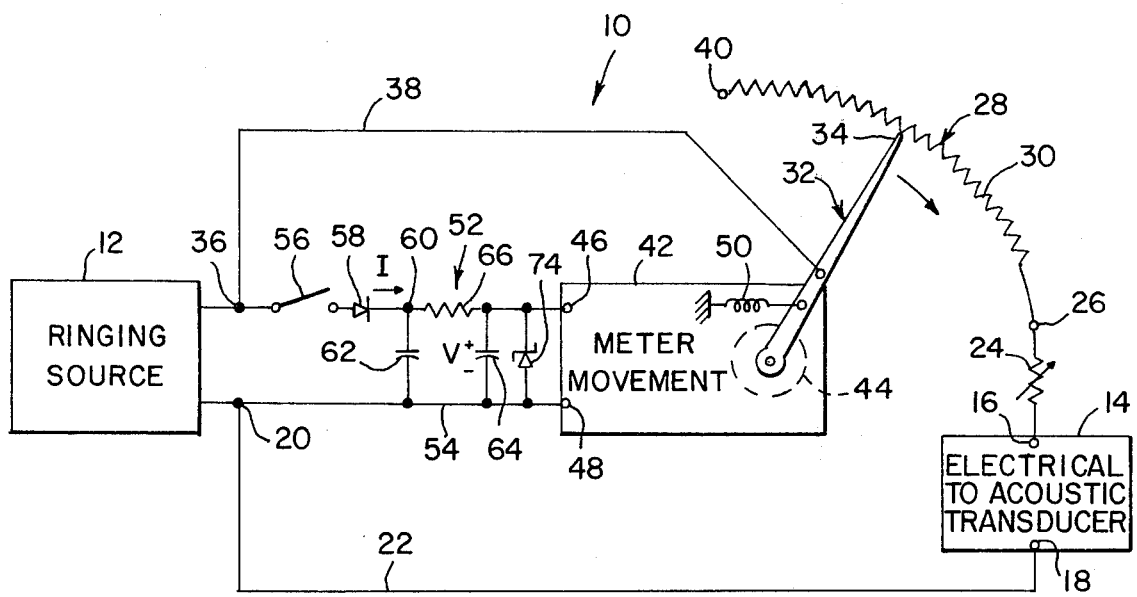

Referring to FIG. 1 of the drawing, the crescendoing signalling device of the present invention is generally indicated by the reference numeral 10 and for example may be located within a telephone (not shown). The device 10 is responsive to a source 12 of spaced sequential bursts or pulses such as produced at a telephone central station for sequentially ringing a telephone. The device 10 includes an electrical to acoustic transducer 14, for example a speaker, which produces an acoustic output signal in proportion to the amplitude of an appropriate voltage applied across its terminals 16 and 18.

Terminal 18 is connected to terminal 20 of source 12 by lead 22 while terminal 16 is connected to a manually variable resistor 24 which serves as an intensity adjustment for transducer 14. The other end of variable resistor 24 is connected to a terminal 26 of what effectively comprises a motor driven potentiometer 28.

Potentiometer 28 comprises an elongated resistor 30 which is formed in an arcuate shape. Terminal 26 comprises one end of resistor 30. Cooperating with resistor 30 is a rotary wiper or needle 32 whose tip 34 runs along resistor 30 in contact therewith. Wiper 32 is connected to the outer terminal 36, of source 12 by lead 38. It should be appreciated that the amplitude of the current through transducer 14 may be varied by rotating wiper 32. In particular, the current and therefore the output acoustic amplitude of transducer 14 will increase steadily from a minimum level when the wiper 32 contacts the end 40 of resistance 30 remote from end 26 to a maximum level as the wiper swings clockwise to end 26.

The wiper 32 is driven by a motor means which is conveniently in the form of a meter movement 42 with the wiper 32 forming an indicating needle therefor and the resistance 30 positioned in place of a cooperating scale for the needle. As is well known, meter movement 42 has a rotor 44 which is electromagnetically torqued clockwise in proportion to the signal V applied between its input terminals 46 and 48. Further, movement 42 has a spring means 50 urging needle 32 to a counterclockwise extreme position in line with end 40 of resistor 30. The needle 32 will advance from end 40 an angle proportional to the signal V.

A passive circuit 52 is utilized to convert the output from ringing source 12 to a generally increasing signal V during the course of continued ringing signals for moving wiper 32 for continually decreasing the resistances between source 12 and transducer 14. The circuit 52 includes a lead 54 coupling terminals 20 and 48 and a switch 56 connected to source terminal 36 for enabling selective use of the crescendo feature of the present invention. Switch 56 is connected to a rectifying diode 58 which is in turn coupled to a terminal 60 of a low pass filtering pi-network composed of a capacitor 62 between terminal 60 and line 54, a capacitor 64 effectively across movement terminals 46 and 48 and a resistance 66 between terminals 46 and 60.

Figure 2A:
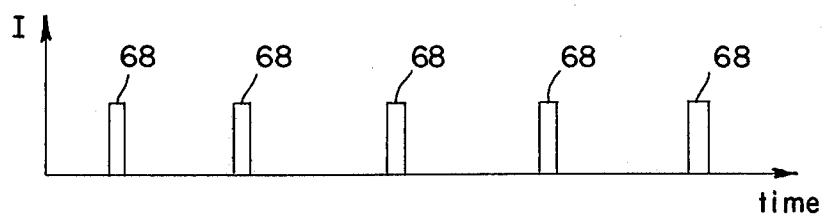
Figure 2B:
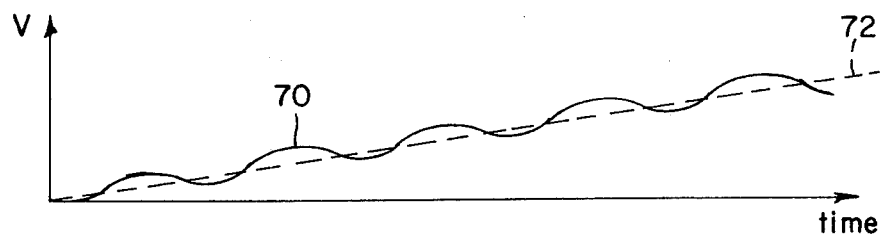

As shown in FIGS. 2A and 2B, the signal from source 12 is rectified by diode 58 to produce a train of unidirectional uniformly spaced pulsations 68 of current I through the diode which slowly cause the output capacitor 64 to charge up to a maximum level. The electrical parameters associated with the circuit 52 and meter movement 42 are chosen such that the capacitor 64 will charge generally with a time constant on the order of the time for a large number of rings such as fifty. Thus the early part of the charging of capacitor 64 will be in the form of a quasi-integration of the current I with V in the form of a generally increasing signal 70 having small ripples about an average ramp 72. In response to the signal V, the needle 32 will continually advance clockwise for decreasing the resistance between source 12 and transducer 14 so that each successive ring is of a higher intensity.

As a further feature, a zener diode 74 is provided shunting terminals 46, 48 for preventing the voltage V from exceeding the full scale deflection voltage for movement 42.

While the preferred embodiment of the present invention has been described in specific detail it should be noted that numerous modifications, additions and omissions in the details thereof are possible within the intended spirit and scope of the invention claimed herein.

What is claimed is:

1. A crescendoing signalling device responsive to a source producing a train of signal pulsations said device comprising: an electrical to acoustical transducer; a potentiometer including a resistor means and a wiper for movement along said resistor means, said potentiometer having a wiper terminal and a terminal connected to said resistor means; said potentiometer being connected in series with said transducer via said terminals; an electric motor means having a rotor coupled to said wiper for moving said wiper along said resistor means; passive circuit means responsive to said source and driving said motor means in a manner for rotating said rotor as said pulsations continue.

2. The device of claim 1 wherein the rotor of said motor means is spring biased and wherein said passive circuit means comprises a quasi-integration means for producing an output signal having a generally increasing amplitude for driving said motor means.

* * * * *

UNITED STATES PATENT AND TRADEMARK OFFICE
CERTIFICATE OF CORRECTION

PATENT NO. : 4,010,329
DATED : March 1, 1977
INVENTOR(S) : Frederick Gaylord Draper It is certified that error appears in the above-identified patent and that said Letters Patent are hereby corrected as shown below:

Column 2, line 34, "outer" should read -- other --.

Signed and Sealed this

Third Day of May 1977

[SEAL]

Attest:

RUTH C. MASON
Attesting Officer

C. MARSHALL DANN
Commissioner of Patents and Trademarks